UNITED STATES PATENT OFFICE.

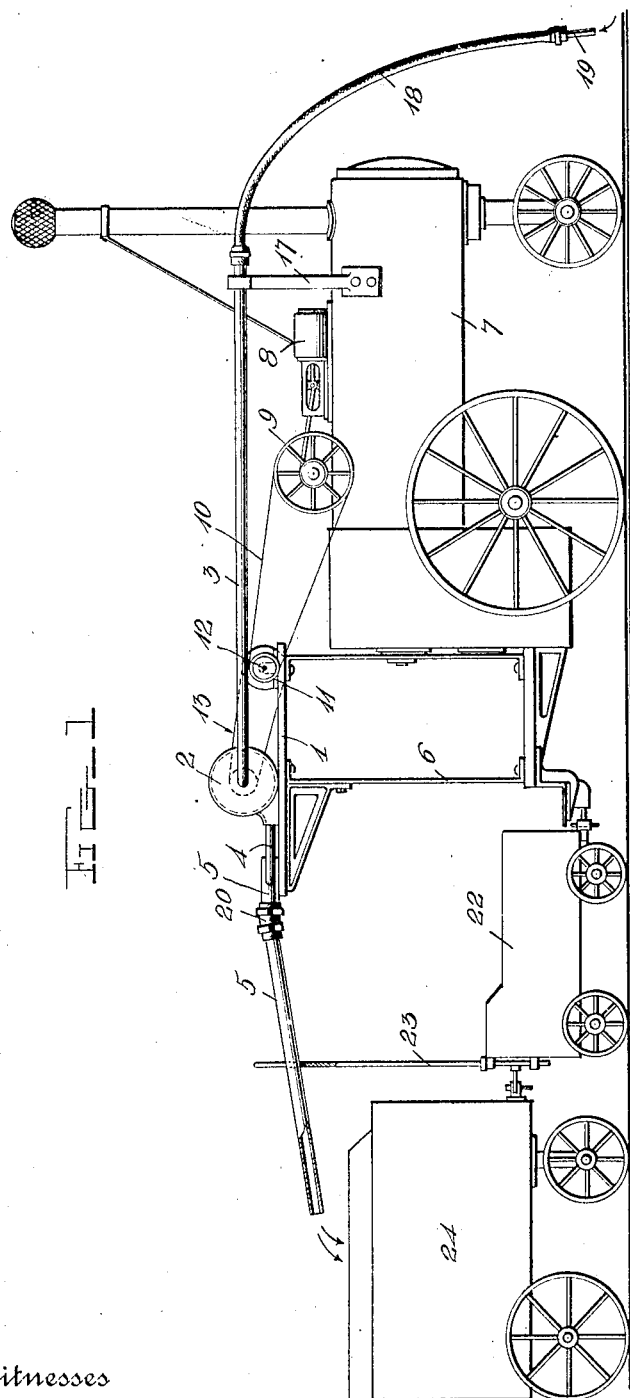

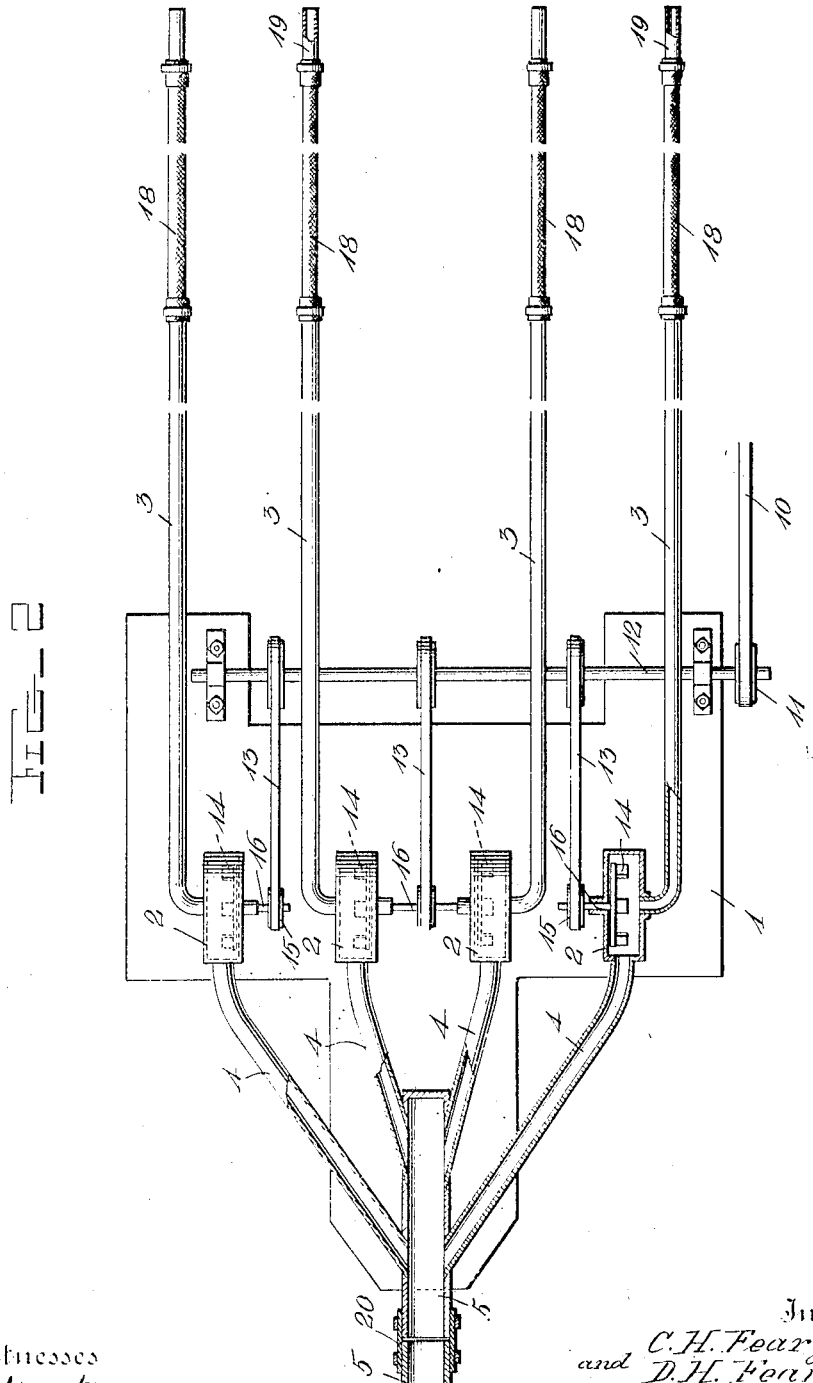

CHARLES H. FEARY AND DANIEL H. FEARY, OF GUTHRIE, OKLAHOMA.

COTTON-PICKER.

No. 882,458.　　　　Specification of Letters Patent.　　　　Patented March 17, 1908.

Application filed November 25, 1907. Serial No. 403,802.

*To all whom it may concern:*

Be it known that we, CHARLES H. FEARY and DANIEL H. FEARY, citizens of the United States, residing at Guthrie, in the county of Logan and State of Oklahoma, have invented certain new and useful Improvements in Cotton-Pickers; and we do declare the following to be a full, clear, and exact description of the invention, such as will enable others skilled in the art to which it appertains to make and use the same.

This invention relates to cotton pickers, and has for its object to provide a cotton picker which is actuated by pneumatic suction.

Another object of the invention is to provide a cotton picker of this kind which is adapted to be combined with a traction engage to be easily moved for operation between the cotton rows.

Another object is to provide a cotton picker of this kind which may be easily and economically operated, and which may be economically manufactured.

For these and other objects which will appear, our invention consists of certain novel combinations and arrangements of parts of which the herein described embodiment of our invention is illustrated.

We do not limit ourselves to the minute details herein described, as the details, proportions and arrangements of parts may be greatly varied without departing from the spirit and scope of the invention.

In the annexed drawings, in which like reference characters refer to like parts throughout, Figure 1 is a side elevation of our cotton picker shown attached to a traction engine; and Fig. 2 is a top plan view of the cotton picker removed from said engine.

As shown in the drawings, which are for illustrative purposes only and not drawn to any particular scale, our device comprises a foundation plate, 1; a plurality of blowers, 2, placed thereon; suction pipes, 3, and a plurality of discharge pipes, 4, all merging into a larger pipe, 5. The foundation plate 1 is mounted on top of and may be, if desired, a part of the cab, 6, of the traction engine, 7, having mounted thereon a horizontal engine, 8, with a fly wheel, 9. The fly wheel, 9, is connected as by a belt, 10, with a pulley, 11, on a countershaft, 12. From the countershaft are passed belts, 13, for operating the centrifugal fans, 14, of the blowers, 2, by means of the pulleys, 15, and the shafts, 16.

It will be noticed that the two inner fans are operated from the single shaft, 16. The suction pipe 3 communicates with the center of the side of the blower 2 and is passed forwardly over a supporting rack, 17, on the forward part of the traction engine boiler. To the forward ends of each of said pipes is attached a flexible rubber hose, 18, which hangs downwardly as shown and terminates in a nozzle, 19, convenient to be held by the hand. The discharge pipes, 4, are fastened tangentially to the lower part of the blowers, 2, as shown, and pass rearwardly to converge and merge into the larger pipe, 5. The large pipe 5 is provided between its rear end and the point where said pipes 4 join thereto, with a flexible coupling, 20, adapted to allow such movement between the ends of the pipe as is necessitated by the flexible connection between the traction engine 7 and its tender, 22. On the rear end of the tender is mounted a brace, 23, to support said pipe, 5. Under the discharge end of the pipe 5 and to the rear end of the tender 22 is attached a wagon, 24, adapted to receive the seed cotton as it is discharged from the pipe 5. The traction engine 7 is provided, as is usual with traction engines, with means by which the running gear and the power shaft may be operated at the same time, or separately.

Cotton is harvested with our improved picker as follows: The traction engine, with the tender and wagon, are caused to move down the cotton row by an engineer who will sit in the cab, 6. The fly wheel 9 causes, by means of the belt 10 and 13, the fans, 14, to exhaust the air in the suction pipes, 3, forming a partial vacuum therein, the exhaust air being drawn by centrifugal force out through the exhaust pipes, 4. The nozzles, 19, are held by the hands of persons operating them in such a way that the current of air passing therein, as indicated by the small arrow in Fig. 1, will carry the ripe seed cotton from the boll through the nozzle 19, and between the belts of the fan, 14, and, finally, out the discharge end of the pipe 5 into the wagon, 24. It will be noticed that four suction nozzles are provided. These will be operated by four persons, one to each nozzle.

It is thought that the operation of our cotton picker will be understood without a more extended description.

Having thus described our invention, what we claim as new and desire to secure by Letters-Patent, is:

1. In combination, a traction engine having a cab, a plurality of fan blowers mounted on said cab, suction pipes from said blowers passing forwardly over said traction engine, a brace for the forward end of said pipes, flexible hose fastened on the forward end of said pipes, discharge pipes leading from said blower fans, said discharge pipes converging and merging into a large rearwardly extending pipe.

2. In combination, a traction engine having a supporting brace mounted forwardly thereon, a cab mounted to the rear of said traction engine, a tender attached rearwardly of said cab, and a receiving-wagon attached to the rear of said tender, a broad foundation plate mounted on said cab, a plurality of blowers mounted on said foundation plate, each blower consisting of an outer casing bearing a journal in which is mounted for rotation a shaft to actuate a fan contained in said casing, the fans of two of said blowers being mounted on a single shaft, suction pipes leading from approximately the center of a side of said casing forwardly over said traction engine and said brace support, flexible hose communicating with the forward ends of said suction pipes, a nozzle on the free end of said hose, exhaust pipes leading tangentially from the lower side of said casings and converging and merging into a larger exhaust pipe, a flexible coupling between the ends of said larger exhaust pipe, a brace on the rear end of said tender to support said larger exhaust pipe, whereby the cotton will be directed into said wagon, and means on said traction engine whereby said traction engine may be caused to move between the rows of cotton or not, at will, while the fans are being operated.

In testimony whereof we have hereunto set our hand in presence of two subscribing witnesses.

CHARLES H. FEARY.
DANIEL H. FEARY.

Witnesses:
DAVID N. SOWERS,
OTTO BURST.